E. CHICKERING.

FIRE PLACE.

No. 10,610. Reissued June 16, 1885.

Witnesses.
R. B. Poulinson
L. Cooper

Inventor.
Edwin Chickering
By Justus M. St. John
His Atty.

N. PETERS, Photo-Lithographer, Washington, D. C.

UNITED STATES PATENT OFFICE.

EDWIN CHICKERING, OF CEDAR RAPIDS, IOWA.

FIRE-PLACE.

SPECIFICATION forming part of Reissued Letters Patent No. 10,610, dated June 16, 1885.

Original No. 308,465, dated November 25, 1884. Application for reissue filed March 11, 1885.

*To all whom it may concern:*

Be it known that I, EDWIN CHICKERING, of Cedar Rapids, in the county of Linn and State of Iowa, have invented certain new and useful Improvements in Fire-Places; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to open fire-places wherein it is desired to increase the heating capacity of the same; and it consists in a novel construction of a heat-deflecting hood, in combination with a damper, and air-heating spaces about the sides and top of the fire-place, as will be fully understood from the following description, when taken in connection with the annexed drawings.

Figure 1:
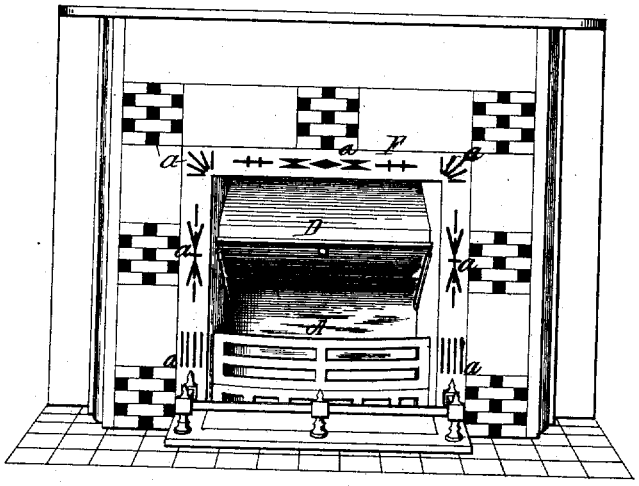
Figure 2:
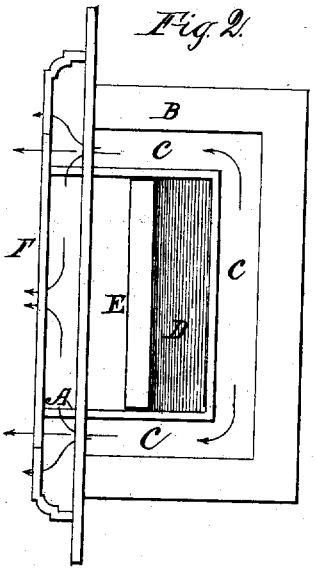

In the drawings, Figure 1 represents a front elevation of my invention; Fig. 2, a plan view showing the arrangement of air-spaces, and Fig. 3 a sectional side elevation of the same.

Similar letters of reference indicate corresponding parts.

Figure 3:
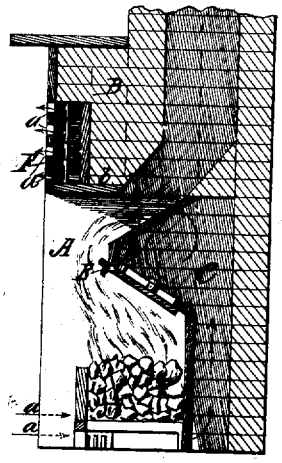

In the usual opening formed in a chimney, B, is set the heater or fire-place proper, A. This is preferably of iron, and is made smaller than the opening in the chimney, thus leaving a space behind it and at each side, C C C. This space is entirely "headed over," so as to leave no communication between it and the flue. The sides of this heater A extend a short distance beyond the "breast" of the chimney, and unite with the surrounding frame-work of the mantel or front F, leaving a space between it and the chimney, as shown in Fig. 2. The air-space also communicates with a chamber formed between the mantel and the chimney above the fire-place, as represented in Fig. 3. The front F is provided with a series of openings, *a a a*, which allow a free circulation of air to and from the air-space C C. It may be of any desired material and pattern. In the drawings it is represented as of alternate marble or slate and tiles laid up with spaces between. The whole may be of brass or other metal in open-figured work, if desired. To avoid unduly heating the mantel-shelf, a considerable space of non-conducting material is interposed between it and the air-chamber above the front of the fire-place. It is not absolutely necessary to the invention that it have this upper air-chamber, or that the mantel-front be thrown out from the chimney, as shown. The sides of the fire-box or heater may be just flush with the chimney-breast, and the side openings be covered by a flat perforated slab of any proper material, allowing admission and escape of air only at the sides; but on account of its greater attractiveness and the better circulation it affords, I prefer the form represented.

The object and effect of the invention will now be readily seen. A large proportion of the heat generated by a grate-fire is radiated toward the sides and back. With the exception of a little reflected heat, this, in ordinary fire-places, is wasted and goes up the chimney, or heats the chimney itself without raising the temperature of the apartment appreciably; but in my invention this heat serves to raise the temperature of the air in the spaces adjacent, which are in direct communication with the air in the room, the cooler air entering said spaces at the lower registers and the heated air escaping into the room through the registers above. The apartment is thereby warmed with the greatest possible economy of fuel.

To deflect the draft forward, and also to greatly increase the capacity of the fire-place for heating the air behind it, said fire-place is provided with a hollow angular projection, D, the upper and rearwardly-extending portion of which supports a part of the chimney. To its under side is attached a damper, E, adapted to slide forward and backward for the purpose of regulating the draft in a manner so simple as to require no verbal description. The front part of the fire-place is bridged over by a suitable slab, *b*, which supports the superincumbent chimney.

I am aware that open fire-places have been constructed before my invention with an air-heating fire-back and a short projecting perforated portion at their upper ends.

I am also aware that open fire-places have been constructed with air-heating spaces at the back and sides and breast. These features I disclaim; but I am not aware that any fire-place has hitherto been provided with a hollow and impervious forwardly-projecting deflector and radiator adapted to operate in connection with such air-spaces, or that the front of the mantel or side of the fire-place has ever before been adapted to receive cool air at the bottom and pass a current of heated air directly outward toward the center of the room.

Having thus described my invention, what I claim as new, and desire to secure by Letters Patent, is—

In combination with an open fire-place, an open fire-box provided with a hollow angular chimney-supporting and heat-deflecting hood, D, having a sliding damper, E, on its under side, a slab, *b*, a grate, A, air-spaces C C C at the back and sides of the said fire-box closed on top, an air-space above the slab *b*, and a mantel, all constructed and adapted to operate substantially in the manner and for the purposes described.

In testimony whereof I affix my signature in presence of two witnesses.

EDWIN CHICKERING.

Witnesses:
L. COOPER,
W. T. CLARK.